(12) United States Patent
de Figueiredo Gomes et al.

(10) Patent No.: US 7,847,054 B2
(45) Date of Patent: Dec. 7, 2010

(54) METHOD FOR THE SYNTHESIS OF A POLYOXADIAZOLE POLYMER

(75) Inventors: Dominique de Figueiredo Gomes, Apensen (DE); Marcio Rodrigo Loos, Geesthacht (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 12/369,133

(22) Filed: Feb. 11, 2009

(65) Prior Publication Data

US 2009/0203870 A1 Aug. 13, 2009

(30) Foreign Application Priority Data

Feb. 13, 2008 (DE) .............. 10 2008 009 068

(51) Int. Cl.
*C08G 63/68* (2006.01)
*C08G 63/44* (2006.01)

(52) U.S. Cl. .............. 528/287; 528/322; 528/363

(58) Field of Classification Search ............. 528/287, 528/322, 363
See application file for complete search history.

(56) References Cited

U.S. PATENT DOCUMENTS

| | | | | |
|---|---|---|---|---|
| 3,567,698 A | * | 3/1971 | Kovacs et al. ........... | 528/28 |
| 3,644,297 A | * | 2/1972 | Sekiguchi et al. ........ | 525/419 |
| 3,734,893 A | * | 5/1973 | Studinka et al. ......... | 528/363 |
| 4,054,633 A | | 10/1977 | Richardson et al. | |
| 4,423,202 A | | 12/1983 | Choe | |
| 4,476,295 A | * | 10/1984 | Stephens ............... | 528/322 |
| 4,500,701 A | * | 2/1985 | Stephens ............... | 528/363 |
| 4,519,940 A | | 5/1985 | Schroeder et al. | |
| 4,599,399 A | | 7/1986 | Kurkov | |
| 2005/0282998 A1 | * | 12/2005 | Nakaya et al. .......... | 528/423 |

FOREIGN PATENT DOCUMENTS

| | | |
|---|---|---|
| DE | 24 08 426 | 8/1975 |
| DE | 2721454 | 12/1977 |
| DE | 3341377 | 7/1984 |
| DE | 292919 | 8/1991 |
| DE | 102007029542 | 1/2009 |
| EP | 1642920 A | 4/2006 |
| EP | 2009728 A | 12/2008 |
| GB | 2130593 A | 6/1984 |
| JP | 63118331 | 5/1988 |
| RU | 2263685 | 11/2005 |

OTHER PUBLICATIONS

Hensema et al., "Synthesis and Properties of Related Polyoxiazoles and Polytriazoles", Journal of Polymer Science, Feb. 1994, pp. 527-537.
Gomes et al., "Characterization of Partially Sulfonated Polyoxiazoles and Oxadiazole-triazole copolymers", Journal of Membrane Science, Apr. 2007, pp. 121-129.
Iwakura et al. Journal of Polymer Science.: Part A, vol. 3, 1965, pp. 45-54.
Krongauz et al., Vysokomol soyed 1970;A12, No. 1, Kinetic dependences of polycyclization . . . .
Gomes et al.; Polymer 42 (2001) 851-865; Study of the synthesis of poly (4, 4'-diphenylether-1,3,4 . . . .
Gomes et al. (2003) Polymer 44 (2003) 3633-3639; Synthesis and characterization of flexible polyoxadiazole . . . .
Gomes et al.; Polymer 45 (2004) 4997-5004; Effects of reaction variables on the reproducibility of the . . . .
Gomes et al.; Journal of Power Sources 175 (2008) 49-59; Single-step synthesis of sulfonated polyoxadiazoles . . . .
Gomes (2002) PhD thesis, COPPE/UFRJ, Rio de Janeiro, Brazil, 2002.
German Office Action for DE 102008009068.9 dated Sep. 2, 2008.

* cited by examiner

*Primary Examiner*—Terressa M Boykin
(74) *Attorney, Agent, or Firm*—Michaud-Kinney Group LLP

(57) ABSTRACT

A polyoxadiazole polymer is synthesized by heating polyphosphoric acid to a temperature of at least about 160° C. and making a solution by mixing hydrazine sulfate salt with one or more dicarboxylic acids or their derivatives in the heated polyphosphoric acid. The solution is heated under an inert gas atmosphere and the polymer is precipitated in a basic solution. The polyoxadiazole polymer can be produced as a homopolymer or copolymer, and may be used to produce a membrane or fibers.

19 Claims, 2 Drawing Sheets

METHOD FOR THE SYNTHESIS OF A POLYOXADIAZOLE POLYMER

CROSS-REFERENCE TO RELATED APPLICATION

This application claims the benefit of German Patent Application Serial No. 10 2008 009 068.9, filed Feb. 13, 2008, which is incorporated herein by reference.

FIELD OF THE INVENTION

The invention concerns a method for the synthesis of a polyoxadiazole polymer, the product polymer and the uses thereof.

BACKGROUND

Polyoxadiazoles (abbreviated as "POD" below) exhibit high chemical and thermal stability as well as high glass transition temperatures. They can be processed directly, for example spun into fibers, or coatings can be made from them.

Polyoxadiazoles are synthesized in various solvents. A known example is the synthesis using oleum (fuming sulfuric acid) as a solvent. Oleum constitutes a very toxic and corrosive synthesis environment. After the end of the synthesis reaction, excessive neutralization of the medium is necessary. The synthesis of polyoxadiazoles in oleum is described, for example, in DD 292 919 A5 and DE 24 08 426 C2.

Iwakura et al. (Y. Iwakura, K. Uno, S. Hara, J. Polym. Sci.: Part A, 1965, 3, pp. 45-54) were the first to demonstrate a method for the production of a polyoxadiazole based on the reaction of a hydrazine sulfate with dicarboxylic acid in polyphosphoric acid (PPA). Nonetheless, the correlations between the properties of the polyoxadiazoles created with various synthesis parameters remained unclear for a long time and also have still not yet been studied in-depth and understood.

RU 2263685 discloses a method for the manufacture of poly(1,3,4-oxadiazole) with molecular masses between 60,000 and 450,000 Da (Dalton, corresponds to g/mole). The method includes a polycondensation reaction of dicarboxylic acid with hydrazine derivatives or with dicarboxylic acid dihydrazide at a temperature of 190° C. to 220° C., which was carried out in a solvent in the presence of triphenyl phosphite for a period of 3 to 7 hours.

JP 63118331 AA discloses a high efficiency method for the synthesis of a polyoxadiazole, in which a dicarboxylic acid and a hydrazine sulfate are condensed using a mixture of phosphorus pentoxide and methanesulfonic acid as a condensation agent.

Polyphosphoric acid is produced during the reaction of phosphorus pentoxide with water and has the general structural formula

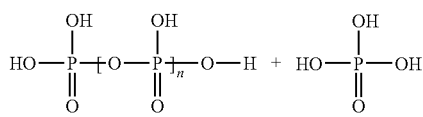

with the right term representing phosphoric acid (PA), the left a polyphosphoric acid (PPA) and n a whole number.

PPA is a good solvent for many organic compounds. It is one of the most effective reagents for performing acylation, alkylation, cyclization and for acid-catalyzed reactions. PPA has also proven useful in polymer synthesis. Despite the large number of publications in the field of synthesis applications of PPA, many aspects regarding the effects of PPA as an acid catalyst are not known. Most proposed mechanisms which involve this solvent are not supported by experimental data.

Krongauz et al. (Y. S. Krongauz, V. V. Korshak, Z. O. Virpsha, A. P. Tranikowa, V. Sheina, B. V. Lokshin, Vysokomol soyed 1970; A12:135-139) proposed the hypothesis that the addition von phosphorus pentoxide ($P_2O_5$) to the reaction medium during a polymerization in PPA leads to a higher molecular weight of the synthesized polyoxadiazoles. In the presence of $P_2O_5$, a viscosity of the synthesized polymer of 2.34 was found; in the absence of $P_2O_5$ a viscosity of 1.2. Thus it was concluded that the addition of salt increases the molecular weight. However, the comparison experiments were performed under different reaction conditions, among other things different temperatures and reaction times, so that the influence of $P_2O_5$ on the molecular weight of the synthesized polyoxadiazoles is not unambiguously documented by this study.

A method for the synthesis of sulfonated polyoxadiazoles via polycondensation in polyphosphoric acid of hydrazine sulfates with one of a plurality of dicarboxylic acids or derivatives thereof is known from DE 10 2007 029 542.3. This polymer is used for the manufacture of membranes for fuel cells.

A systematic study of the influences of various synthesis parameters on the properties of the synthesized polyoxadiazoles was carried out by Gomes et al. These studies were published in Gomes et al. (2001): D. Gomes, C. P. Borges, J. C. Pinto, Polymer 2001, 42, 851-865;

Gomes (2002): D. Gomes, PhD Thesis, COPPE/UFRJ, Rio de Janeiro, Brazil, 2002;

Gomes et al. (2003): D. Gomes, S. P. Nunes, J. C. Pinto, C. P. Borges, Polymer 2003, 44, 3633-3639;

Gomes et al. (2004): D. Gomes, C. P. Borges, J. C. Pinto, Polymer 2004, 45, 4997-5004; and Gomes et al. (2008): D. Gomes, J. Roeder, M. L. Ponce, S. P. Nunes, J. Power Sources 175 (2008), 49-59.

In these studies, among other things, molecular weight, the fraction of residual hydrazide groups and the degree of sulfonation during POD synthesis in PPA were investigated.

Also studied was the influence of the concentration of anhydride $P_2O_5$ on the synthesis in PPA while keeping all other reaction variables constant (temperature, time, monomer concentration and molar dilution) and varying the proportions of added $P_2O_5$ to the solution medium (Gomes (2002)). In this case it was found that the addition of $P_2O_5$ led to an increase of the viscosity of the reaction medium, so that the reaction medium could no longer be stirred in the reaction apparatus. Therefore the homogenization and reproducibility of the results became worse. All experiments were run in triplicate to study reproducibility.

In the publication Gomes et al. (2001), it was shown that the addition of water to PPA resulted in polyoxadiazoles with higher intrinsic viscosity than without the addition of water to PPA. For this purpose, 7 grams of water were added to PPA. This is ten times the amount of water which was produced by the polymerization reaction itself.

One of the factors influencing the reproducibility of the synthesis of polyoxadiazoles is poor mixing at a microscopic level (micromixing), caused by the high viscosity of the reaction medium during the polymerization. The high viscosity of the reaction medium can cause significant fluctuations of the local monomer compositions, which leads to a shortening of the polymer chain length.

It was proposed that the homogenization could be improved by addition of an inert solvent to the reaction medium, so that the properties of the synthesized polyoxadiazoles could be achieved with higher reproducibility under similar reaction conditions. However, it was found (Gomes et al. (2001), Gomes et al. (2004)) that the addition of small quantities of NMP (N-methyl-2-Pyrrolidone) and DMSO (dimethyl sulfoxide) to PPA does not lead to an improvement of the mixing conditions.

Addition of large quantities of solvents in PPA ultimately led to a reduction of the viscosity of the solution. In this last case, however, the polymerization rate was reduced considerably, because the reaction is catalyzed by PPA. Indeed, the addition of small quantities of water to the reaction medium may even contribute to reducing the PPA viscosity, but water can also disrupt the condensation reaction and change the properties of the synthesized polyoxadiazoles.

In further studies (Gomes et al. (2004), Gomes et al. (2008)), experimental conditions were optimized further for reproducible synthesis of high molecular weight polyoxadiazole samples weight, characterized up to 470,000 g/mole, in which polyoxadiazoles were produced in PPA which showed a high solubility in organic solvents and low residual portions of hydrazide groups.

The polyoxadiazole polymers manufactured according to the state-of-the-art generally exhibited an elasticity of about 4,000 MPa, tensile strengths up to 100 MPa and elongations at break of about 14%.

SUMMARY OF THE INVENTION

The present invention resides in one aspect in a method for the synthesis of a polyoxadiazole polymer. The method includes heating polyphosphoric acid to a temperature of at least about 160° C. and making a solution by mixing hydrazine sulfate salt with one or more dicarboxylic acids or their derivatives in the heated polyphosphoric acid. The solution is heated under an inert gas atmosphere and the polymer is precipitated in a basic solution.

The polyoxadiazole polymer can be produced as a homopolymer or copolymer, and may be used to produce a membrane or fibers.

DETAILED DESCRIPTION OF THE INVENTION

Figure 1:
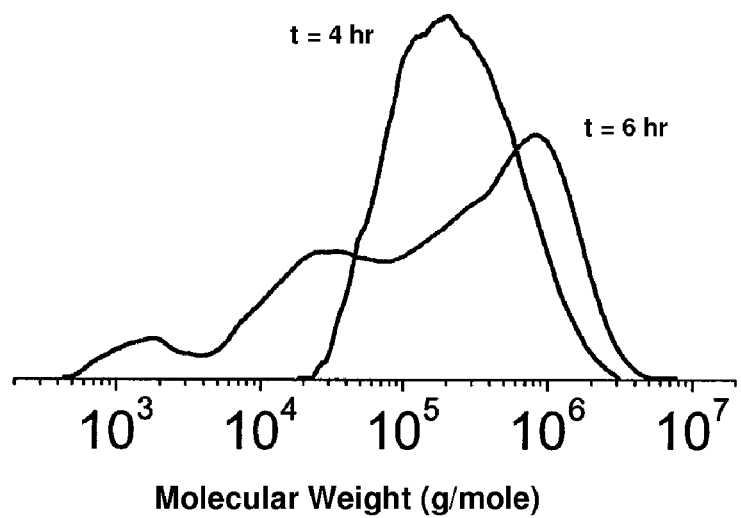
FIG. 1 is a graph showing the molecular weight distribution of polyoxadiazole polymers using current technology for syntheses of varying duration, the graph being normalized on the polystyrene standard.

The present invention provides a method for the synthesis of a polyoxadiazole polymer and the polyoxadiazole polymers produced by the method.

According to a one embodiment, a polyoxadiazole polymer can be synthesized in a one-step polycondensation reaction of a hydrazine sulfate salt with dicarboxylic acids or their derivatives in polyphosphoric acid. The reaction can be carried out by heating the polyphosphoric acid to a temperature of at least 160° C.; making a solution by mixing the hydrazine sulfate salt with one or more dicarboxylic acids or their derivatives in the heated polyphosphoric acid; heating the solution under an inert gas atmosphere; and precipitating the polymer in a basic solution.

In certain embodiments, polyoxadiazole polymers synthesized as described herein show superior mechanical properties relative to other polyoxadiazole polymers, and so offer additional possibilities for use over prior art polyoxadiazole polymers. The disclosed method can yield polyoxadiazole polymers with very high molecular weights, for example, up to about 740,000 g/mole, with a narrow molecular weight distribution as determined by SEC (size exclusion chromatography). The method offers a high quantitative yield, in which the polyoxadiazole polymers produced exhibit a high elasticity modulus up to about 4 GPa, high tensile strengths up to about 200 MPa and elongations at break up to about 60%.

This is achieved by no longer adding the starting materials for the polymerization reaction to PPA at room temperature, as in the prior art, but instead first heating PPA to at least about 160° C. Surprisingly, it was found that this measure leads to the catalytic activity of PPA being maintained or even increased while the homogeneity of the reaction medium is maintained or increased. Furthermore, the effects of poor micromixing in the polymerization medium are avoided.

Without wishing to be bound by any particular theory, the increase of the catalytic activity of PPA is attributed here to the increase of the concentration of free phosphoric acid in the polyphosphoric acid.

In one embodiment, the polymer is neutralized in the basic solution.

The dicarboxylic acids or their derivatives preferably comprise aromatic and/or heteroaromatic dicarboxylic acids or their derivatives. In a preferred embodiment, the dicarboxylic acids or their derivatives are mixed with dicarboxylic acid diesters.

Heating of the polyphosphoric acid takes place to increase the efficiency. In one embodiment, the polyphosphoric acid is heated for at least one hour. However, the invention is not limited in this regard, and in other embodiments, heating may be carried out for a shorter or longer duration. Heating of the polyphosphoric acid preferably takes place under a gas atmosphere, in particular an atmosphere comprised of nitrogen and/or argon, with or without water fractions. However, the invention is not limited in this regard, and in other embodiments, heating may take place in a non-gas atmosphere environment, or under a gas not comprised of nitrogen and/or argon.

In various embodiments, the solution is heated to a temperature of about 160° C. to about 200° C. In particular embodiments, the solution is heated to a temperature in the range of about 160° C. to about 180° C. The duration for heating the solution is about 4 to about 24 hours. In some embodiments, the duration of heating may be up to about 16 hours, and in specific embodiments, heating may be carried out for about 6 to about 8 hours.

In the method according to one embodiment of the invention, the polyoxadiazole has at least one conjugated ring including two nitrogen atoms and one oxygen atom with repeating units of the structure

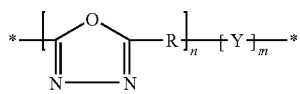

in which Y is a group with the structure

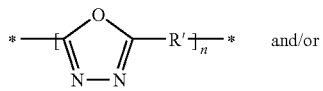  and/or

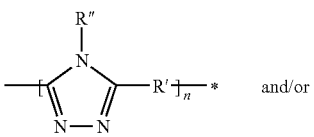  and/or

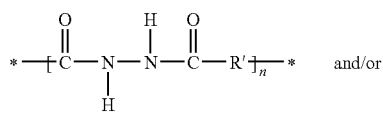  and/or

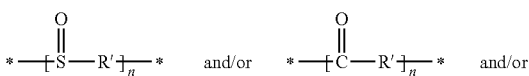  and/or

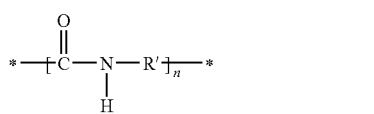

in which R and R' are groups with 1 to about 40 carbon atoms in each case and R" is a hydrogen atom or a group with 1 to about 40 carbon atoms, in which n and m are natural whole numbers each greater than zero.

In another aspect, this invention provides a polyoxadiazole polymer, in particular a homopolymer or copolymer, obtainable in an inventive process described above. In some embodiments, the inventive polyoxadiazole polymer has an average molecular weight greater than about 470,000 g/mole as determined by SEC. The molecular weight distribution $M_w/M_n$ may be less than about 3, in particular less than about 2.4. However, the invention is not limited in this regard, and in other embodiments, the molecular weight may be about 470,000 g/mole or less as determined by SEC and/or the molecular weight distribution MW/Mn may be about 3 or more.

In selected embodiments, the polyoxadiazole polymer described herein has a tensile strength greater than about 120 MPa, in particular greater than about 180 MPa. The elongation at break of some embodiments of the polyoxadiazole polymer is preferably at least about 20%, in particular more than about 50%.

The inventive polyoxadiazole polymer as described herein can be used to manufacture a membrane or a fiber, and/or may be used as a lightweight construction material, or for coatings.

Finally, the present invention provides a membrane, a fiber or a coating made of a polyoxadiazole polymer as described herein.

The invention is described herein, without restricting the general intent of the invention, in the following examples and with reference to the drawings.

EXAMPLE 1

Polyoxadiazole (POD) Synthesis

POD polymers were produced using a known method described below and a selected embodiment of the invention, and their mechanical characteristics were compared.

The average molecular weight of the synthesized polymers was determined by SEC (size exclusion chromatography). A Viskotec SEC apparatus was used with Eurogel separation columns SEC 10000 and PSS Gram 100 and 1000 with a size of 8×300 mm. The equipment was calibrated using polystyrene standards from Merck, which had a weight-averaged molecular weight between 309 and 944,000 g/mole. A solution of 0.05 M lithium bromide in dimethyl acetamide (DMAc) was used as a carrier fluid.

For making homogeneous films and/or membranes, a solution of polyoxadiazole polymers with a concentration of 4 weight percent was prepared in dimethyl sulfoxide (DMSO). After the membranes were drawn, the DMSO was evaporated in a vacuum oven at 60° C. for 24 hours.

To remove the remaining residual solvent, the membranes were immersed for 48 hours in a water bath at 50° C. and subsequently dried in a vacuum oven at 60° C. for 24 hours. The thickness of the membranes thus obtained was about 50 μm (micrometers).

Tensile strength tests to measure the mechanical properties of the membranes obtained were carried out on a Zwick-Roell apparatus as per ASTN D882-00. The elongation speed was 5 mm/min at room temperature. The break stress, elongation at break and elasticity modulus (Young's modulus) were measured. The specified values correspond in each case to the average of 5 samples.

1. Synthesis According to a Known Method

In a synthesis of polyoxadiazole polymers according to Gomes et al. (2001), (2004) and (2008), first PPA was added to a flask and heated to 100° C. under a dry nitrogen atmosphere. Hydrazine sulfate salt (HS, >99%, Aldrich) was added to the PPA and homogenized by stirring and further heating of the reaction medium. After the reaction temperature was reached, 4,4'-diphenyl ether dicarboxylic acid diazide (DPE, 99%, Aldrich) was added to the flask.

The molar dilution ratio (PPA/HS) and molar monomer rate (HS/DPE) were kept constant at 10:1 and 1.2:1 respectively. DPE and HS reacted for 4 to 6 hours. After that, the reaction medium was poured into water containing 5% by weight/vol. of sodium hydroxide (99%, VETEC) in order to precipitate the polymer. The pH of this polymer suspension was monitored according to the known procedure (Gomes et al., (2004)).

The chemical structure of the POD polymer produced is as follows:

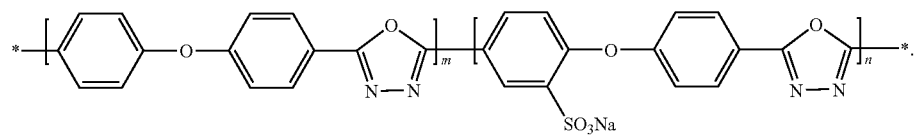

The polyoxadiazole polymers obtained using this known method were soluble in the solvents NMP and DMSO. The average molecular weights of the polyoxadiazole polymers were determined by SEC, which for a reaction time of 4 hours was about 330,000 g/mole, and with a reaction time of 6 hours was about 470,000 g/mole.

FIG. 1 shows the SEC profile, normalized on the polystyrene standard. With an increase of the reaction time from 4 hours to 6 hours, polymers with lower molecular weight on the order of magnitude of 103 g/mole formed, resulting from the concurrent degradation reaction (see Gomes et al. (2001) and Gomes et al. (2008)).

Although the polyoxadiazole with a reaction time of 6 hours had a higher molecular weight, its mechanical properties were not better, because the weight distribution was significantly broader (Mw/Mn=8.1). This result is shown in Table 1 below.

TABLE 1

| Sample | $M_w$ (g/mole) | $M_w/M_n$ | Tensile Strength (MPa) |
|---|---|---|---|
| 4 hr | 328,000 | 2.3 | 100 ± 5.04 |
| 6 hr | 471,000 | 8.1 | 82.2 ± 9.14 |

2. Method According to the Invention

First polyphosphoric acid (PPA) was added to a flask and heated under a dry nitrogen atmosphere for three hours at a temperature of 160° C. After that, hydrazine sulfate salt (HS) was added to the PPA and homogenized by stirring and further heating of the reaction medium. After dissolution of the HS, DPE was added to the flask.

The molar dilution ratio (PPA/HS) and molar monomer ratio (HS/DPE) were kept constant at 10:1 and 1.2:1 respectively. The reaction of DPE and HS was run for four hours. After that, the reaction medium was poured into water containing 5% by weight/vol. of sodium hydroxide (99%, VETEC) in order to precipitate the polymer. The pH of this polymer suspension was monitored as before.

Figure 2:
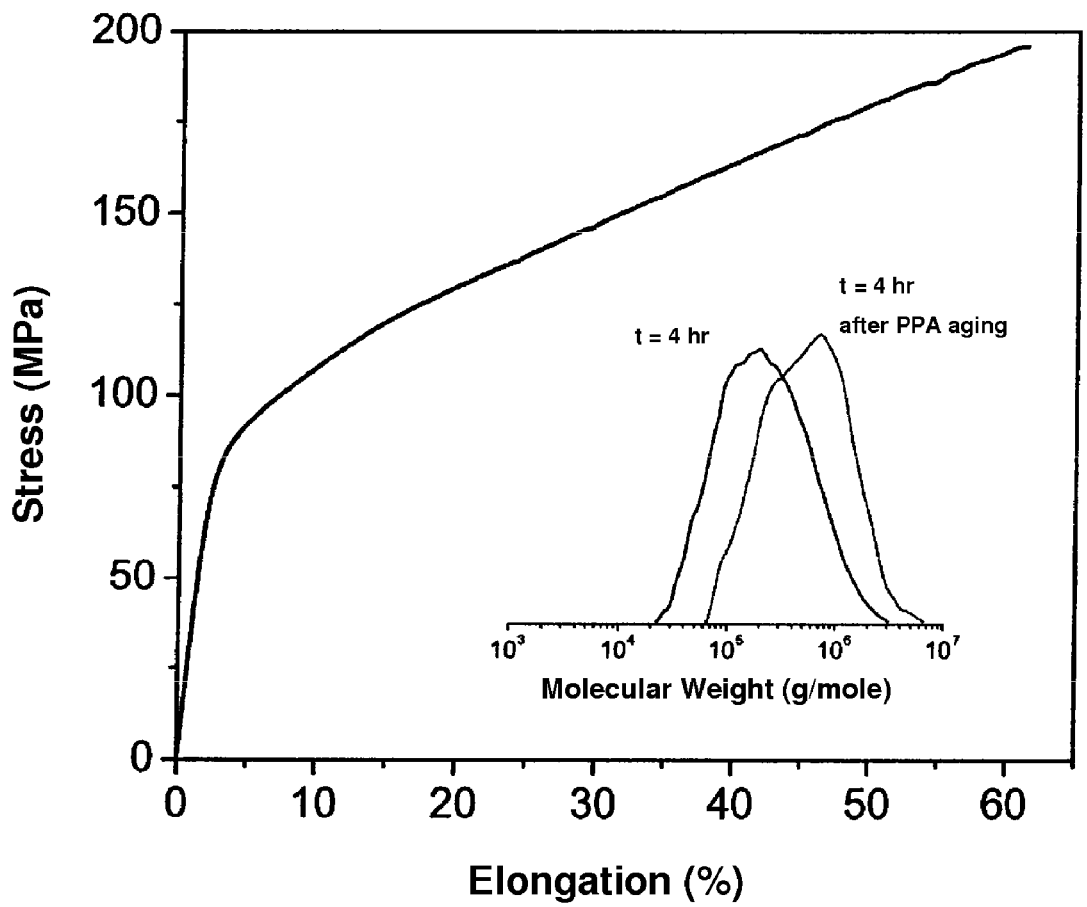
FIG. 2 is a chart showing the tensile strength of a POD polymer produced according to one embodiment of the method described herein, as set forth in part 2 of Example 1.

Using this method, a polyoxadiazole polymer was obtained which was soluble in the solvents NMP and DMSO and had an average molecular weight of 747,000 g/mole determined by SEC. The stress/elongation chart of the polymer film is shown in FIG. 2. The insert shows the SEC profile, normalized to the polystyrene standard. Data collected on the sample polyoxadiazole polymers is set forth in Table 2.

TABLE 2

| Sample | $M_w$ (g/mole) | $M_w/M_n$ | Elasticity Modulus (MPa) | Tensile Strength (MPa) | Elongation at Break (%) |
|---|---|---|---|---|---|
| 4 hr | 328,000 | 2.3 | 4016 ± 194 | 100 ± 5.04 | 14 ± 3.20 |
| 4 hr after PPA aging | 747,000 | 2.1 | 3802 ± 268 | 190 ± 7.82 | 57 ± 5.03 |

Table 2 shows that the mechanical properties, especially the tear resistance and elongation at break improved significantly with respect to the polyoxadiazole polymer obtained by the known methods. For the same elasticity modulus of about 4,000 MPa, within the error of measurement, the average molecular weight is more than doubled. The width of the distribution of molecular weights for the polymer is slightly reduced, the tear resistance nearly doubled and the elongation at break increased four-fold.

EXAMPLE 2

Study of Aging Treatment of Polyphosphoric Acid (PPA)

"Aging treatment" in the present context is understood as the heating of the PPA prior to the polymer synthesis.

Polyphosphoric acid was added to a flask and heated to 160° C. under a dry nitrogen atmosphere for various times ranging from 30 minutes to 3 hours. The increase in the concentration of phosphoric acid in the polyphosphoric acid was analyzed by $^{31}P$ NMR spectroscopy.

Figure 3:
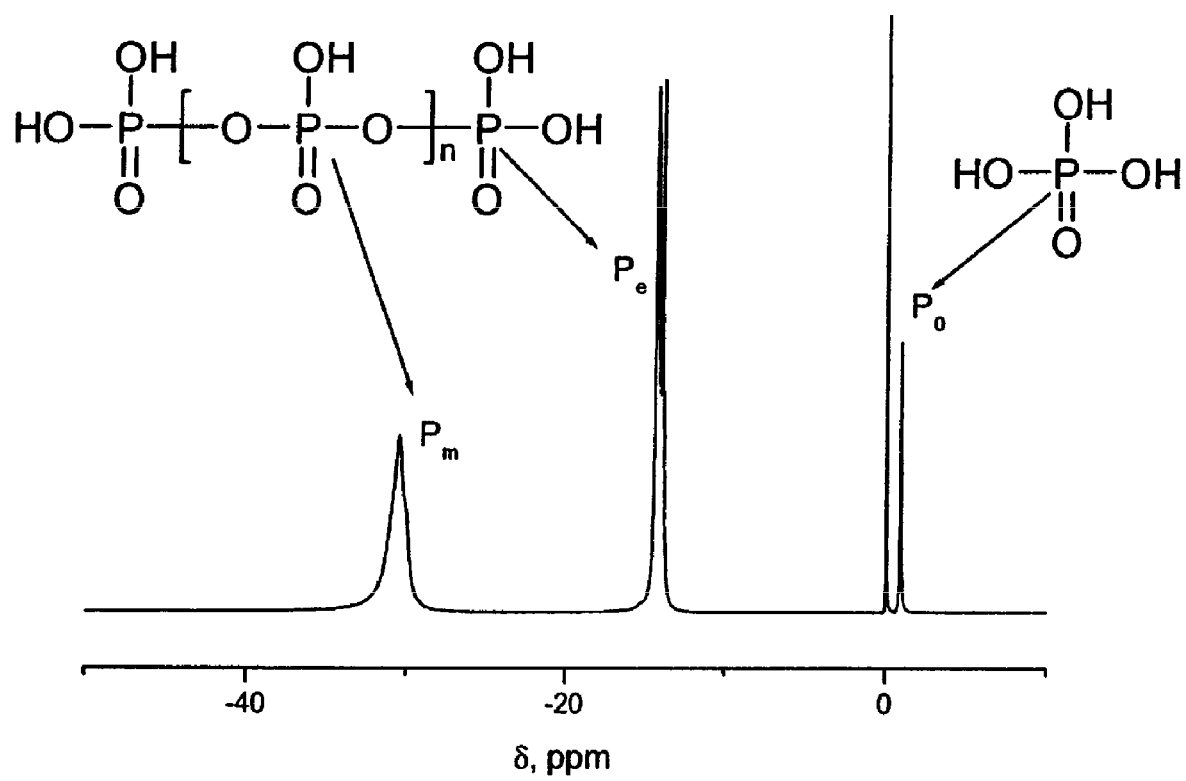
FIG. 3 is an NMR spectrum of a PPA solvent treated in accordance with the invention.

FIG. 3 shows the $^{31}P$ NMR spectrum of PPA after an aging treatment of 3 hours. A Bruker DCX-300 spectrometer was used for the NMR analysis and operated at a frequency of 121.50 MHz, using 85% phosphoric acid as a reference.

The particular phosphorus species and/or their peaks in the spectrum are indicated by arrows. Here $P_m$ in the NMR spectrum indicates the signal at −30.54 for the mid-chain phosphorus atoms, which are arranged in the middle of a PPA chain, $P_e$ the peak at −13.99, for the phosphorus atoms at the end of a PPA chain (end-chain phosphorus) and $P_0$ at 0.966 the peak for the phosphorus atom in phosphoric acid (PA, $H_3PO_4$) along with the peak for free phosphorus at 0.

Table 3 indicates the relative quantities of the three phosphorus species before and after the aging treatment of PPA, for which in each case the individual $P_0$, $P_e$ and $P_m$ peaks were integrated.

TABLE 3

| Preheating of PPA (hr) | $P_0$ | $P_e$ | $P_m$ | Concentration of Free Phosphorus ($P_0/P_0 + P_e + P_m$) |
|---|---|---|---|---|
| 0 | 1.05 | 15.98 | 17.24 | 0.031 |
| 3 | 1.39 | 17.58 | 15.49 | 0.040 |

From the data in Table 3 it can be seen that the aging treatment of PPA increases the concentration of free phosphoric acid and particularly reduces the peak which correlates with the phosphorus in the middle of the PPA chains. The concentration of free phosphoric acid increases here by about 30%, which is sufficient to increase the catalytic activity of PPA. This results in synthesized polyoxadiazole polymers with very high molecular weights and very good mechanical properties.

In summary, a polyoxadiazole polymer can be produced in a one-step polycondensation reaction of a hydrazine sulfate salt with dicarboxylic acids or their derivatives in polyphosphoric acid. In one particular embodiment, the polycondensation reaction is achieved by heating the polyphosphoric acid to a temperature of at least 160° C. and making a solution by mixing the hydrazine sulfate salt with one or more dicarboxylic acids or their derivatives in the heated polyphosphoric acid. The solution is heated under an inert gas atmosphere, precipitating the polymer in a basic solution.

Although the invention has been described with reference to particular embodiments thereof, it will be understood by one of ordinary skill in the art, upon a reading and understanding of the foregoing disclosure, that numerous variations and alterations to the disclosed embodiments will fall within the scope of this invention and of the appended claims.

What is claimed is:

1. A method for the synthesis of a polyoxadiazole polymer, comprising:
   heating polyphosphoric acid to a temperature of at least about 160° C.;
   making a solution by mixing hydrazine sulfate salt with one or more dicarboxylic acids or their derivatives in the heated polyphosphoric acid;
   heating the solution under an inert gas atmosphere; and
   precipitating the polymer in a basic solution.

2. The method of claim 1, including neutralizing the polymer in the basic solution.

3. The method of claim 1, wherein the dicarboxylic acids or their derivatives comprise aromatic and/or heteroaromatic dicarboxylic acids or their derivatives.

4. The method of claim 1, comprising mixing the dicarboxylic acids or their derivatives with dicarboxylic acid diesters.

5. The method of claim 1, comprising heating the polyphosphoric acid for at least about one hour.

6. The method of claim 1, comprising heating the polyphosphoric acid under a gas atmosphere.

7. The method of claim 1, wherein the gas atmosphere is an atmosphere comprising nitrogen and/or argon.

8. The method of claim 1, comprising heating the solution to a temperature of about 160° C. to about 200° C.

9. The method of claim 1, comprising heating the solution for about 4 to about 24 hours.

10. The method of claim 1, wherein the polyoxadiazole has at least one conjugated ring including two nitrogen atoms and an oxygen atom with repeating units of the structure

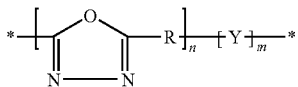

in which Y is a group with the structure

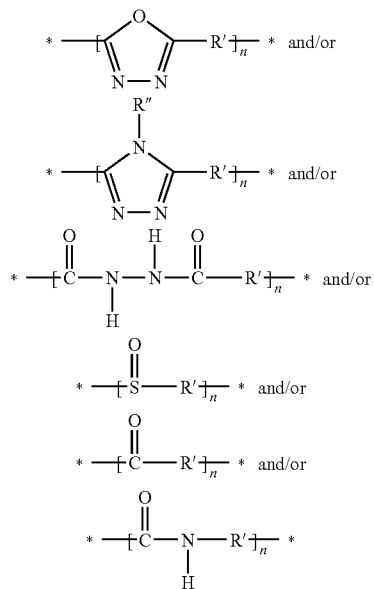

in which R and R' are groups with 1 to about 40 carbon atoms in each case and R" is a hydrogen atom or a group with 1 to about 40 carbon atoms, in which n and m are natural whole numbers each greater than zero.

11. The method of claim 1, comprising heating the solution for about 4 to about 16 hours.

12. The method of claim 1, comprising heating the solution for about 6 to about 8 hours.

13. The method of claim 1, wherein the method comprises a one-step polycondensation reaction.

14. A polyoxadiazole polymer, in particular a homopolymer or copolymer obtained by the method of claim 1, the polyoxadiazole polymer having an average molecular weight greater than about 470,000 g/mole as determined by SEC (size exclusion chromatography).

15. The polyoxadiazole polymer of claim 14 having a molecular weight distribution $M_w/M''$ of less than about 3.

16. The polyoxadiazole polymer of claim 14 having a tensile strength greater than about 120 MPa.

17. The polyoxadiazole polymer of claim 14 having an elongation at break of at least about 20%.

18. A membrane made of a polyoxadiazole polymer according to claim 14.

19. Fibers made of a polyoxadiazole polymer according to claim 14.

* * * * *

UNITED STATES PATENT AND TRADEMARK OFFICE
CERTIFICATE OF CORRECTION

| | |
|---|---|
| PATENT NO. | : 7,847,054 B2 |
| APPLICATION NO. | : 12/369133 |
| DATED | : December 7, 2010 |
| INVENTOR(S) | : Dominique de Figueiredo Gomes and Marcio Rodrigo Loos |

It is certified that error appears in the above-identified patent and that said Letters Patent is hereby corrected as shown below:

Column 10, line 44: After "distribution", please delete "$M_w/M^n$" and substitute --$M_w/M_n$--.

Signed and Sealed this
Eighth Day of March, 2011

David J. Kappos
*Director of the United States Patent and Trademark Office*